United States Patent
Jackow (10) Patent No.: US 9,150,130 B2
(45) Date of Patent: Oct. 6, 2015

(54) PORTABLE HEADREST

(71) Applicant: Kaz Julian Jackow, Kailua Kona, MI (US)

(72) Inventor: Kaz Julian Jackow, Kailua Kona, MI (US)

( * ) Notice: Subject to any disclaimer, the term of this patent is extended or adjusted under 35 U.S.C. 154(b) by 223 days.

(21) Appl. No.: 13/931,834

(22) Filed: Jun. 29, 2013

(65) Prior Publication Data

US 2015/0001905 A1  Jan. 1, 2015

(51) Int. Cl.
*A47C 7/38* (2006.01)
*B60N 2/48* (2006.01)

(52) U.S. Cl.
CPC .............. *B60N 2/4805* (2013.01); *A47C 7/383* (2013.01); *B60N 2/4879* (2013.01)

(58) Field of Classification Search
CPC ..... A47C 7/383; B60N 2/4805; B60N 2/4879
USPC ........................ 297/397, 402, 409, 400; 5/640
See application file for complete search history.

(56) References Cited

U.S. PATENT DOCUMENTS

| | | | |
|---|---|---|---|
| 2,120,310 A * | 6/1938 | Duncan | .............................. 5/640 |
| 4,249,712 A | 2/1981 | DeLong | |
| 5,060,903 A | 10/1991 | Schwoerer | |
| 6,648,416 B2 | 11/2003 | O'Conner et al. | |
| 6,666,517 B2 * | 12/2003 | Clough | ..................... 297/408 X |
| 7,040,705 B2 | 5/2006 | Clough | |
| 7,264,313 B2 * | 9/2007 | Clough | .......................... 297/409 |
| 8,893,333 B2 * | 11/2014 | Soto et al. | ...................... 5/640 X |
| 2013/0232696 A1 * | 9/2013 | Halimi et al. | ..................... 5/640 |
| 2014/0312186 A1 | 10/2014 | Mech | |

* cited by examiner

Primary Examiner — Anthony D Barfield
(74) *Attorney, Agent, or Firm* — Mastrogiacomo PLLC (57) ABSTRACT

A portable headrest is provided that includes a center plate, a first side plate, a second side plate, the center plate, the first side plate and the second side plate configured to support a human head. The headrest further includes a first hinge mechanism to couple the first side plate to the center plate, the first side plate configured to rotate about the first hinge mechanism relative to the center plate, a second hinge mechanism to couple the second side plate to the center plate, the second side plate configured to rotate about the second hinge mechanism relative to the center plate, an inner rail assembly, the inner rail assembly including a ratchet assembly to couple the inner rail assembly to the center plate such that the inner rail assembly extends angularly from the center plate, the ratchet assembly configured to allow the center plate to rotate relative to the inner rail assembly and an outer rail assembly, the inner rail assembly sized and configured to slide freely within the outer rail assembly.

18 Claims, 12 Drawing Sheets

PORTABLE HEADREST

CROSS REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON COMPACT DISC

Not Applicable

BACKGROUND OF THE INVENTION

1. Field of the Invention

The present invention relates generally to a headrest and, more particularly, to a portable headrest that is capable of being used while seated in a vehicle such as an airplane, a train, car and the like or while seated on furniture such as chairs, sofas, beds and the like.

2. Background Art

Headrests may be found attached on many forms of body support members to provide support for the head while seated. Often, headrests are situated on airplane seats, train seats and car seats and the like to support the head while in a seated or prone position. Furniture such as chairs, sofas, beds and the like may also include some type of support for the head while in a seated or prone position. Headrests have been designed and are in use to support the head and aid in reducing stress and strain on the neck and back.

Headrests are used mainly to aid in the reduction of neck and back strain that one may experience from being in a seated position for a long period of time and having to support the weight of their head. Typically, those that must remain seated for long periods of time such as on an airplane flight, train, car or truck may experience strain on the neck and back muscles if the headrests are not designed to support the head properly. Furthermore, proper head, neck and back support from a headrest may make the difference between refreshing travel and thoroughly exhausting travel. While designers take great care in designing headrests to support the head, often designers, in the design of headrests, must consider other factors such as package, cost and safety. Taking these other factors into account, designers may have to sacrifice some functionality and support features that may not be recognized on short flights, train rides or car and truck rides, but become more relevant during longer travel periods. Furthermore, headrests that have been designed for these vehicles are often limited in the adjustments that may be made to accommodate people of different sizes and shapes.

Therefore, a need exists for a portable headrest that is configured for use in any number of vehicles such as airplanes, trains, trucks cars and the like as well as any type of furniture that may be adjusted to the needs of a specific individual to support the head and alleviate neck and back stain and other physiological issues that may stem from an improperly supported head.

BRIEF SUMMARY OF THE INVENTION

A portable headrest is provided that includes a center plate, a first side plate, a second side plate, the center plate, the first side plate and the second side plate configured to support a human head. The headrest further includes a first hinge mechanism to couple the first side plate to the center plate, the first side plate configured to rotate about the first hinge mechanism relative to the center plate, a second hinge mechanism to couple the second side plate to the center plate, the second side plate configured to rotate about the second hinge mechanism relative to the center plate, an inner rail assembly, the inner rail assembly including a ratchet assembly to couple the inner rail assembly to the center plate such that the inner rail assembly extends angularly from the center plate, the ratchet assembly configured to allow the center plate to rotate relative to the inner rail assembly and an outer rail assembly, the inner rail assembly sized and configured to slide freely within the outer rail assembly, the outer rail assembly including a ratchet assembly to couple the outer rail assembly to a mount such that the outer rail assembly extends angularly from the mount, the ratchet assembly configured to allow the outer rail assembly to rotate relative to the mount.

BRIEF DESCRIPTION OF THE SEVERAL VIEWS OF THE DRAWINGS

The features and inventive aspects of the present invention will become more apparent from the following detailed description, claims, and drawings, of which the following is a brief description:

DETAILED DESCRIPTION OF THE INVENTION

Referring now to the drawings, preferred illustrative embodiments of the present invention are shown in detail. Although the drawings represent embodiments of the present invention, the drawings are not necessarily to scale and certain features may be exaggerated to better illustrate and explain the present invention. Further, the embodiments set forth herein are not intended to be exhaustive or otherwise to limit or restrict the invention to the precise forms and configurations shown in the drawings and disclosed in the following detailed description.

Figure 1:
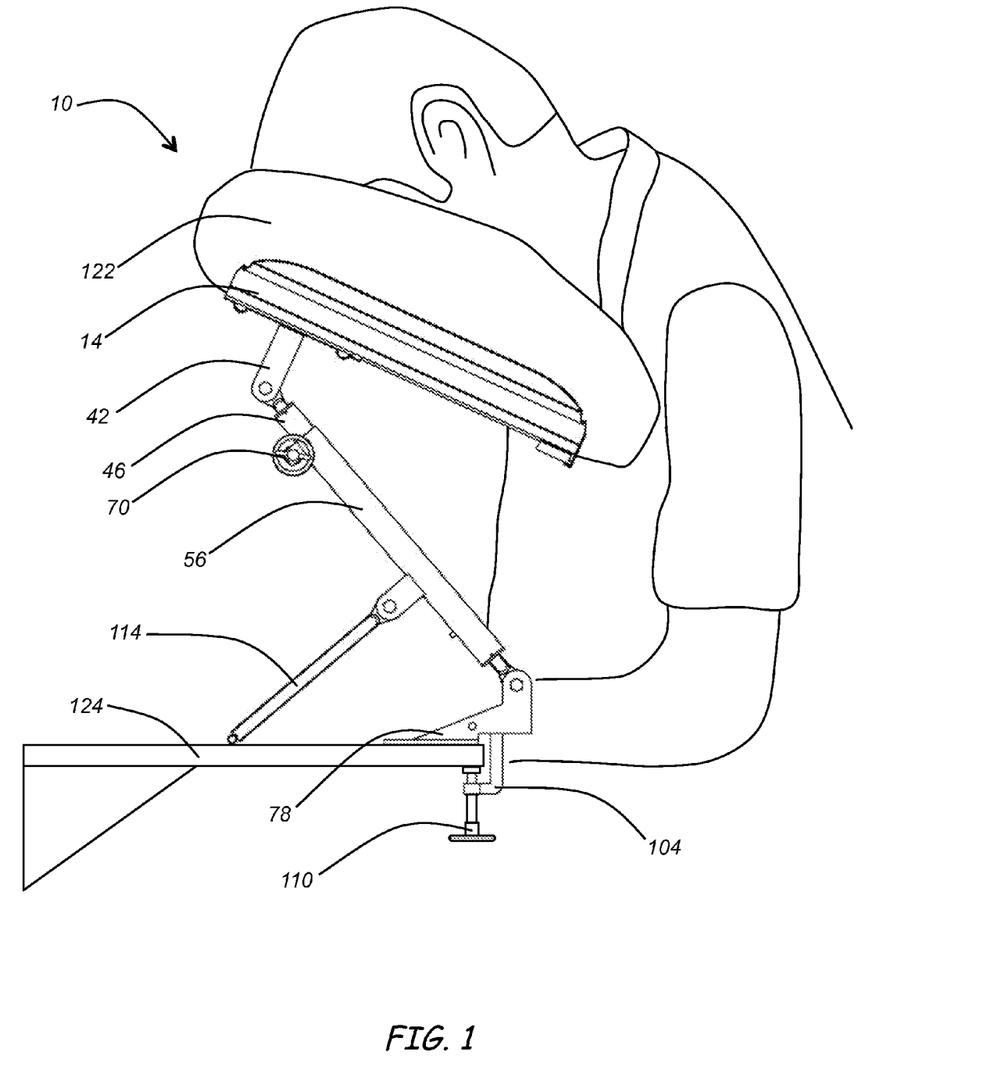
FIG. 1 is an environmental view showing and individual utilizing a portable headrest according to an embodiment of the present invention.

Now referring to the drawings, an individual shown using portable headrest 10 is illustrated in FIG. 1. Headrest 10 is configured to be portable and easily adaptable for use in any vehicle such as an airplane, train, boat, truck, car and the like. Headrest 10 may also be used with any type of furniture such as a chair, table, sofa, bed and the like. Headrest 10 may be used while in a seated or prone position as well as while standing. Headrest 10 may be designed in this manner to aid in the relief of neck or back strain caused by the lack of adequate head support brought on by having to remain in a single position (such as remaining seated) for long periods of time, such as while traveling on a transatlantic airplane flight. The individual depicted in FIG. 1 is shown using headrest 10 with a cushion 122 as headrest 10 is anchored to a tray 124, tray 124 may be connected to a seat in front of the individual as is typical on any airplane found throughout the world. Headrest 10 may also be used to facilitate any type of massage therapy as well as an extension of a tray or table to comfortably position reading material or a computer relative to an individual for work or reading.

As illustrated in FIGS. 1-11, headrest 10 may be configured from the following components. Headrest 10 includes a center plate 12 that is positioned in between a first side plate or wing 14 and a second side plate or wing 16. Center plate 12 includes a first tube 18 disposed on a first edge 20 of center plate 12 and a second tube 22 disposed on a second edge 24 of center plate 12. First side plate 14 includes a pair of tubes 26 disposed on an edge 28 of plate 14. Pair of tubes 26 are positioned on edge 28 such that tube 18 of center plate 12 may be situated between pair of tubes 26. A pin 30 may be introduced through tubes 18 and 26 to secure center plate 12 to first side plate 14 (See FIG. 8) to create a hinge 32 such that position of first side plate 14 may be changed relative to center plate 12. Second side plate 16 also includes a pair of tubes 34 disposed on an edge 36 of plate 16. Pair of tubes 34 are positioned on edge 36 such that tube 22 of center plate 12 may be situated between pair of tubes 32. A pin 38 may be introduced through tubes 22 and 34 to secure center plate 12 to second side plate 16 (See FIG. 8) to create a hinge 40 such that position of second side plate 16 may be changed relative to center plate 12 and first side plate 14.

Figure 8:
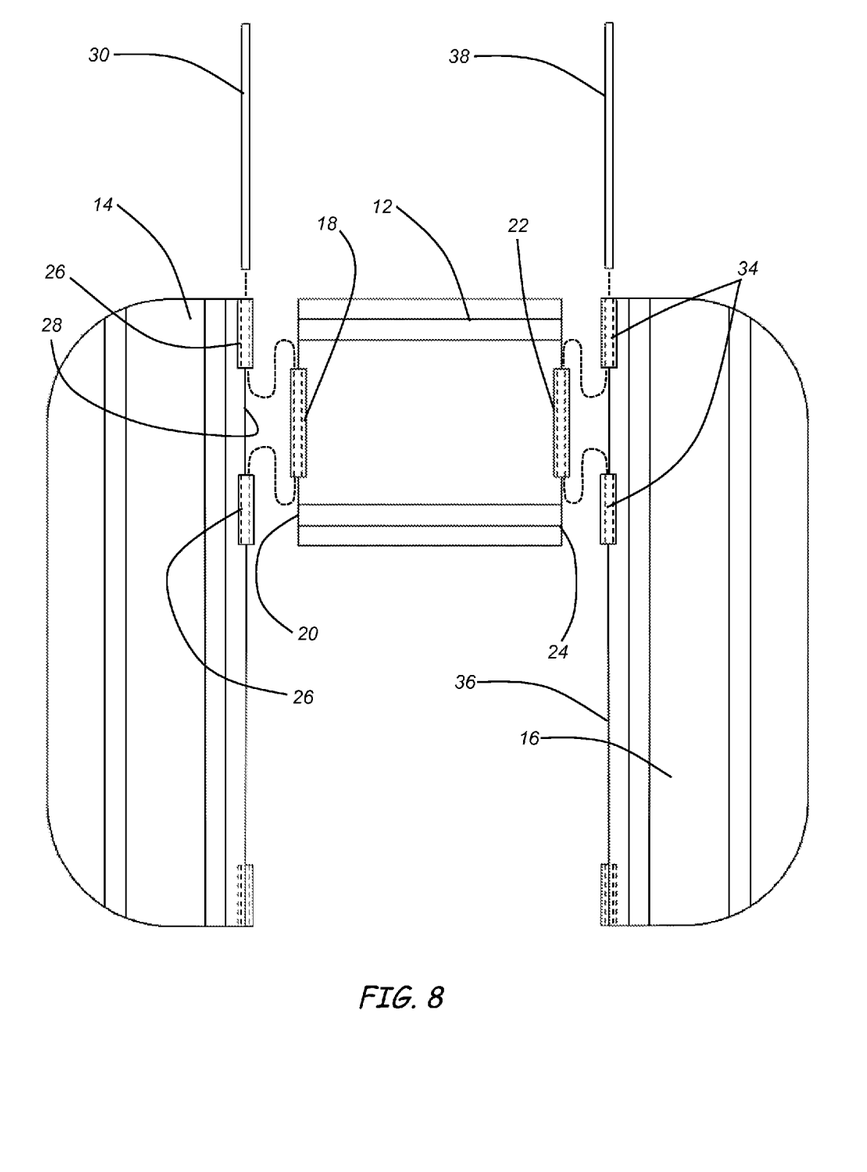
FIG. 8 is an exploded view of a center plate, a first side plate and a second side plate of the headrest according to an embodiment of the present invention.

Plates 12, 14 and 16 may be manufactured of any type of material such as steel, aluminum and like metals, plastic and other materials to ensure adequate support for the head, yet lightweight for ease of portability. Plates 12, 14 and 16 may include ribbing to strengthen the material to help to ensure the total weight of headrest 10 is minimal for ease of portability. Tubes 18 and 22 may be secured to center plate 12 by welding, glue and like means to ensure tubes 18 and 22 are securely fastened to center plate 12. Alternatively, tubes 18 and 22 may be rolled into a metal blank of center plate 12 during the stamping and forming process.

Figure 9A:
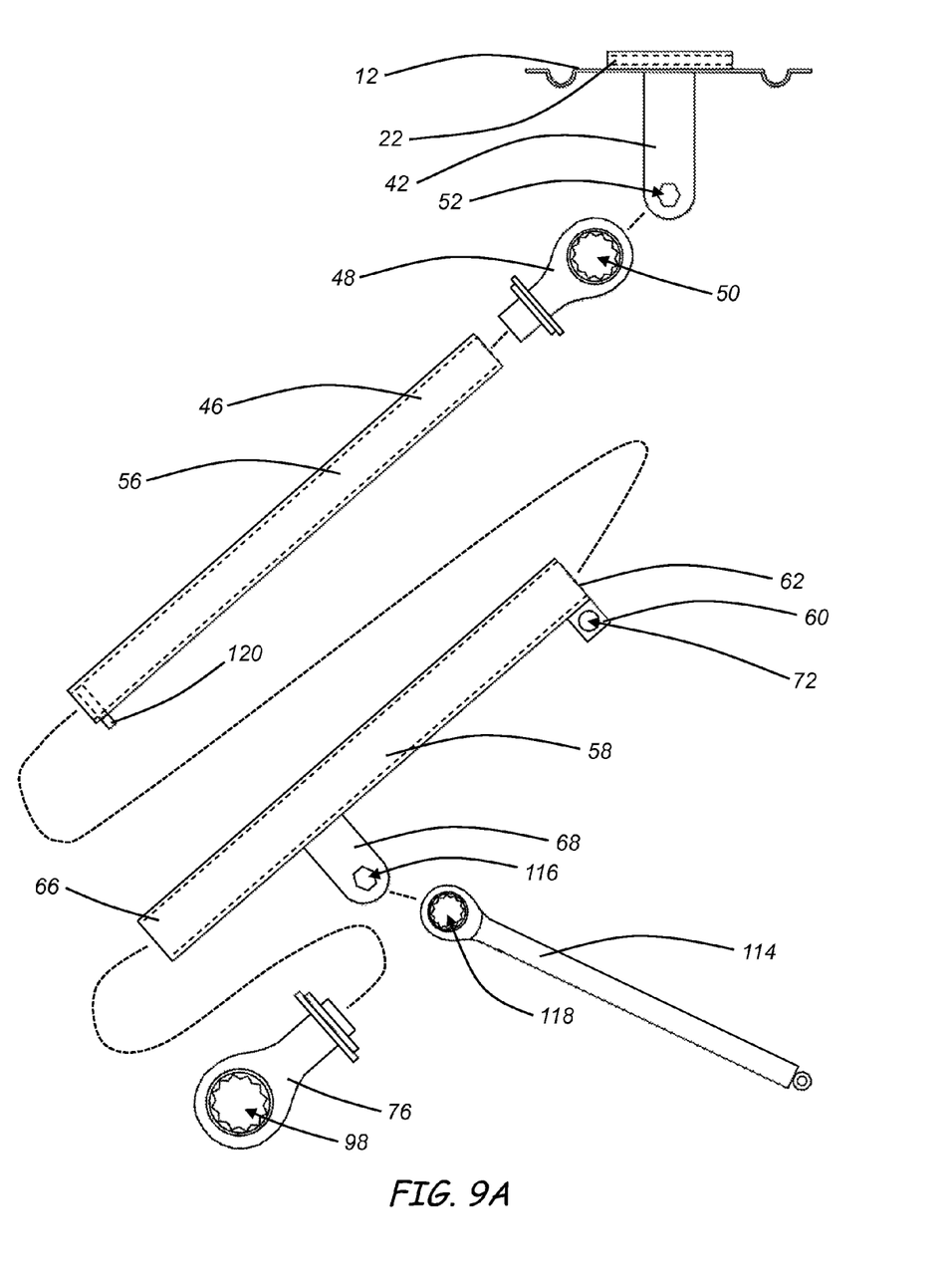
FIG. 9A is an exploded view of the center plate, an inner rail assembly, an outer rail assembly and a brace assembly of the headrest according to an embodiment of the present invention.

Center plate 12 may also include at least one tab 42 that extends from a bottom surface 44. Preferably, two tabs 42 may be used in an embodiment of the present invention to capture and secure an inner rail assembly 46 to center plate 12. Inner rail assembly 46 may include a head assembly 48 that is press fit and welded to one end of inner rail assembly 46. Head assembly 48 may include a hole 50 that may align with a hole 52 of tabs 42 when a section of head assembly 48 is positioned between tabs 42. A fastener 54 such as a threaded bolt may be passed through holes 50 and 52 with the head of fastener 54 engaging tab 42 and an end of fastener 54 projecting from the opposite of tab 42. A typical nut may be added to the end of the bolt to complete fastener 54 and secure inner rail assembly 46 to center plate 12.

Alternatively, a hex shaped pin may be secured in hole 52 of tabs 42 and hole 50 of head assembly 48. The hex pin may fit securely within teeth of hole 50 such that the edges of the hex pin engage the teeth of hole 50. Head assembly 48 may be a typical ratchet assembly with the ratchet mechanism of hole 50 allowed to rotate with respect to head assembly 48. The ratchet assembly may allow head assembly 48 to be rotated in a first direction and locked in a second direction. Typically, a switch is added to the ratchet assembly to allow the rotation and locking directions of the ratchet assembly to be changed. With hex pin and the teeth of hole 50 engaged and the switch in a first position, the location of head assembly 48 relative to center plate 12 can be adjusted to optimize the position of center plate 12 to suit the individual. The switch may be moved to a second position to allow the ratchet assembly to be moved in the opposite direction. Enabling head assembly 48 in this manner provides for the position of center plate 12 to be changed relative to head assembly 48 and inner rail assembly 46 to allow the individual position headrest 10 in the position most comfortable for the individual.

Figure 9B:
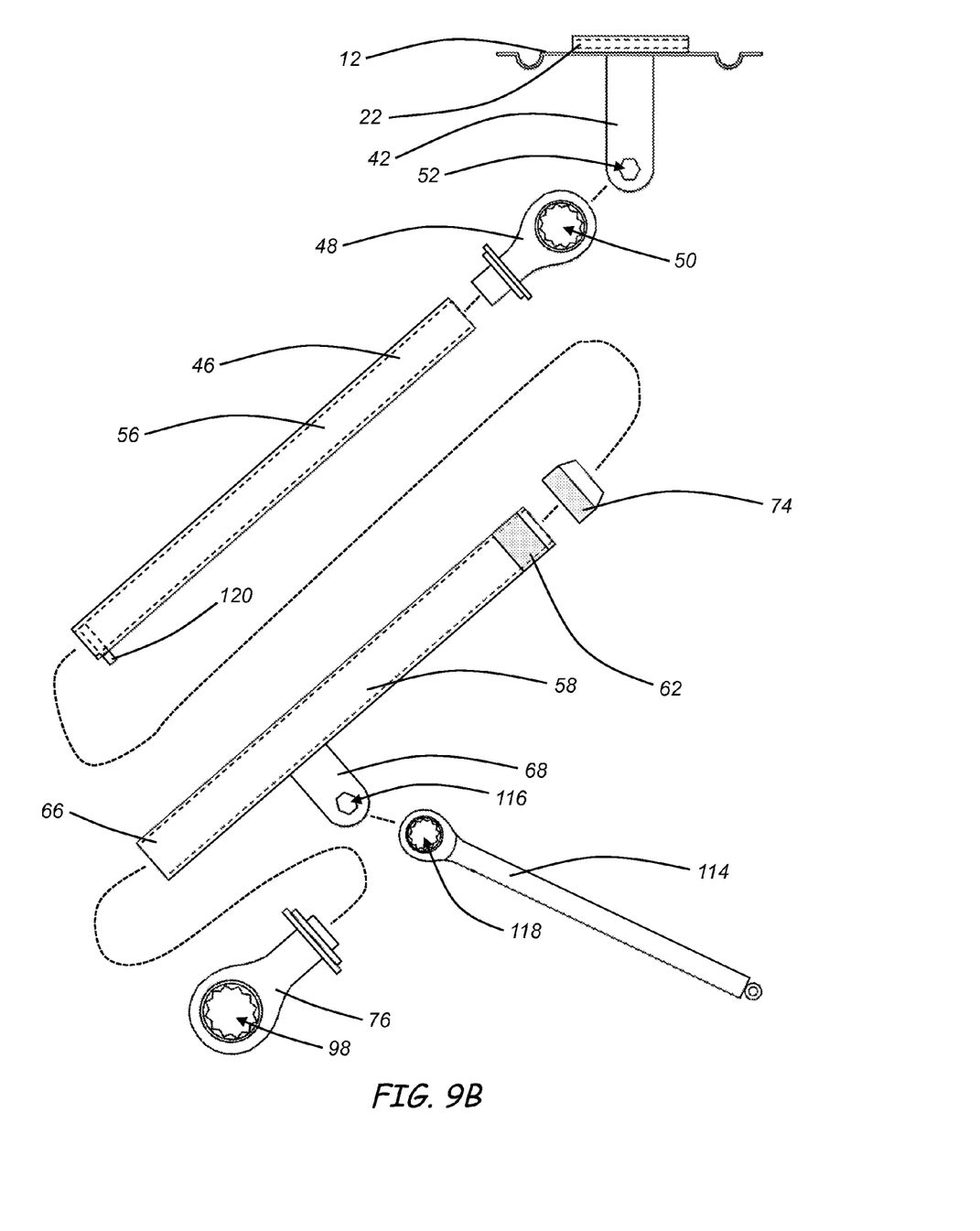
FIG. 9B is an exploded view of the center plate, the inner rail assembly, a second outer rail assembly and the brace assembly of the headrest according to another embodiment of the present invention.
Figure 11:
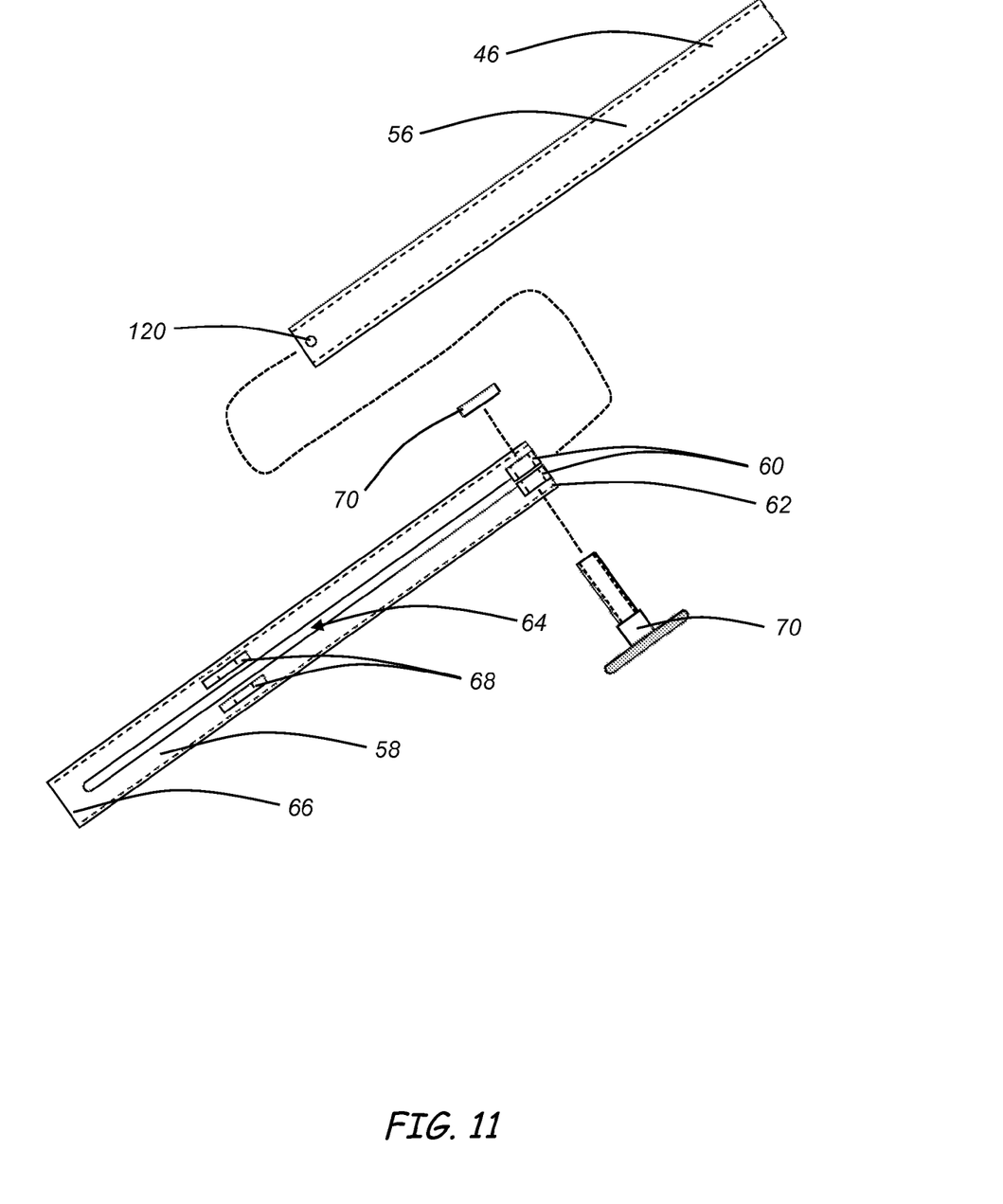
FIG. 11 is an exploded view of the inner rail assembly, the outer rail assembly and a tensioning screw according to an embodiment of the present invention.

As illustrated in FIGS. 9A, 9B and 11, a body 56 of inner rail assembly 46 is sized such that inner rail assembly 46 may slide freely within an outer rail assembly 58. The outer diameter of inner rail assembly 46 may be slightly less than the inner diameter of outer rail assembly 58 to allow inner rail assembly 46 to slide freely within outer rail assembly 58. Inner rail assembly 46 and outer rail assembly 58 may be configured in this manner to provide a telescoping feature such that the height of plates 12, 14 and 16 may be adjusted relative to tray table 124 to adapt to the size and for the comfort of the individual using headrest 10.

Figure 10:
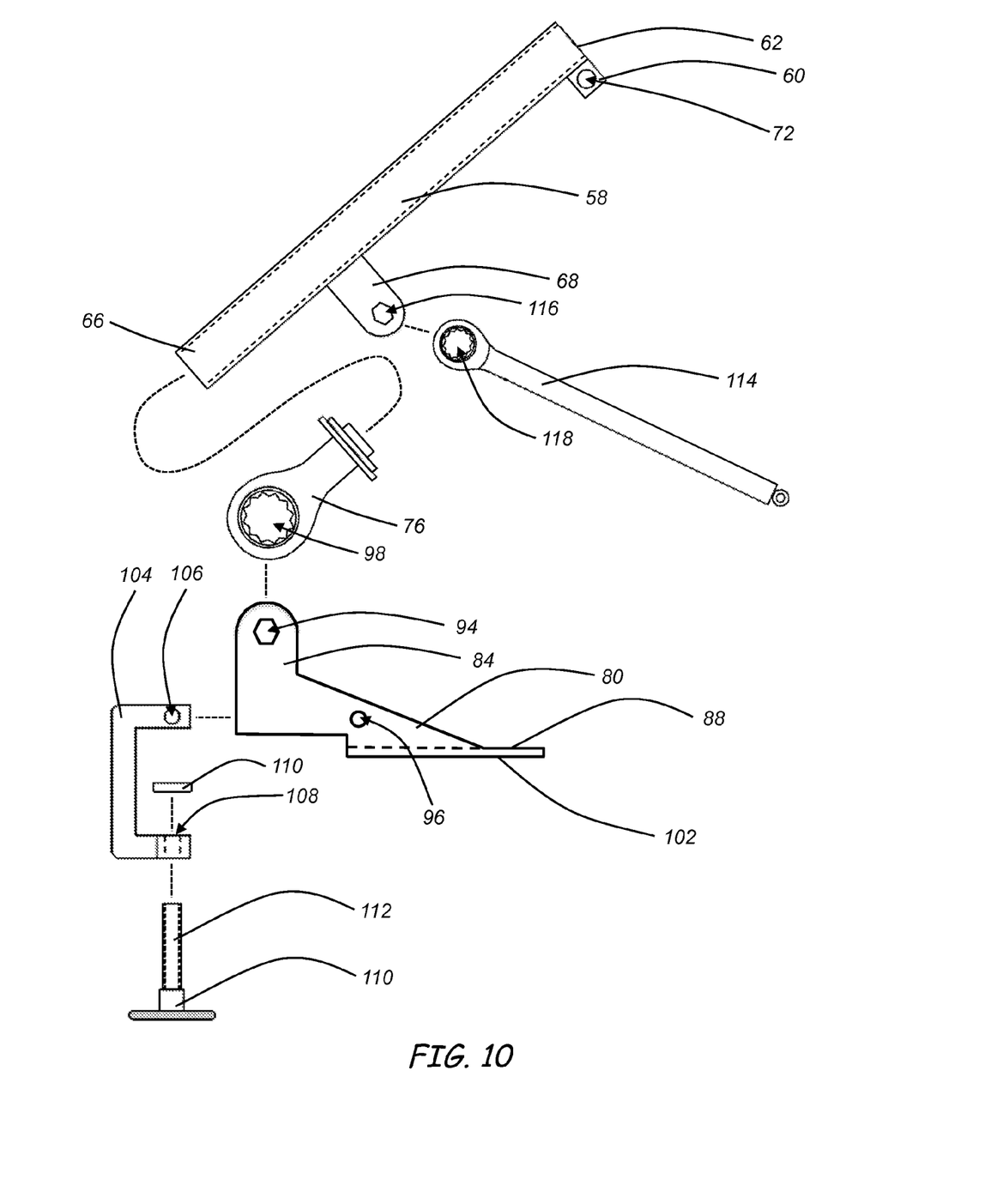
FIG. 10 is an exploded view of the outer rail assembly, the brace assembly, a second clamp base, a clamp body and a clamp screw according to an embodiment of the present invention.

As depicted in FIGS. 9A, 10 and 11, outer rail assembly 58 may include a pair of blocks 60 disposed at a first end 62 of outer rail assembly 58 that engages inner rail assembly 46. Blocks 60 are positioned at first end 62 on either side of slot 64 such that blocks 60 are separated from one another. Blocks 60 may be secured to outer rail assembly 58 by welding blocks 60 to outer rail assembly 58. Outer rail assembly 58 further includes at least one tab 68. In this particular embodiment of the present invention, two tabs 68 are illustrated. Tabs 68 are positioned near a midpoint of outer rail assembly 58 and tabs 68 may be welded to outer rail assembly 58 about on either side of slot 64. Outer rail assembly 58 still further includes a head assembly 76 that may be secured to second end 66 of outer rail assembly 58 by press fit, welding or other means of securing head assembly 76 to outer rail assembly 58.

Each of blocks 60 include holes 72 that have been drilled and tapped to accept a tensioning screw 70. Tensioning screw 70 may be introduced into one side of hole 72 of block 60 and through to the opposite hole 72 of the second block 60. Screw 70 may be rotated in a manner that draws each of blocks 60 closer together such that the distance between blocks 60 is closed and the gap of slot 64 is narrowed. The narrowing of slot 64 is advantageous to capture and secure a section of inner rail assembly 46 is within outer rail assembly 58. The narrowing of the gap provided by slot 64 decreases the inner diameter of outer rail assembly 58 such that the inner diameter of outer rail assembly 58 clamps the outer diameter of inner rail assembly 46 to create an interference fit between the outside of inner rail assembly 46 and the inside diameter of outer rail assembly 58 and restrict the movement of inner rail assembly 46 relative to outer rail assembly 58 to fix the position of inner rail assembly 46 relative to outer rail assembly 58.

In another embodiment of the present invention illustrated in FIG. 9B, blocks 60 and tensioning screw 70 may be replaced by a separate mechanism to capture a section of inner rail assembly 46 to outer rail assembly 58. In this particular embodiment, first end 62 is threaded and configured to accept an outer rail nut 74. Outer rail nut 74 includes an inner diameter that is slightly tapered such that as outer rail nut 74 is rotated about outer rail assembly 58 over the threads, the gap provided by slot 64 decreases the inner diameter of outer rail assembly 58. With a section of inner rail assembly 46 positioned within outer rail assembly 58, the inner diameter of outer rail assembly 58 clamps the outer diameter of inner rail assembly 46 as outer rail nut 74 is rotated about the threads to create an interference fit between the outside of inner rail assembly 46 and the inside diameter of outer rail assembly 58 and restrict the movement of inner rail assembly 46 relative to outer rail assembly 58 to fix the position of inner rail assembly 46 relative to outer rail assembly 58.

Slot 64 of outer rail assembly 58 may be sized to accept a pin 120 of inner rail assembly 46 as depicted in FIGS. 9A, 9B and 11. Pin 120 is allowed to slide freely within slot 64, but pin 120 is sized relative to slot 64 to prevent the rotation of inner rail assembly 46 relative to outer rail assembly 58. With pin 120 positioned in slot 64, inner rail assembly 46 can slide fore and aft about outer rail assembly 58, but any rotational movement will be limited by pin 120 as it engages walls of slot 64. Limiting the rotation of inner rail assembly 46 with respect to outer rail assembly 58 while adjustments are made to locate headrest 10 in the desired position will help to ensure that center plate 12 and side plates 14 and 16 are aligned with the other components of headrest 10.

Inner rail assembly 46 and outer rail assembly 58 may be may be manufactured of any type of material such as steel, aluminum and like metals, plastic and other materials to ensure adequate support for the head, yet lightweight for ease of portability. Although this particular embodiment of the present invention depicts the cross sectional geometry inner rail assembly 46 and outer rail assembly 58 as round, it is important to note, however, that the cross section of both rail assemblies may be square, triangular, oval and the like to allow inner rail assembly 46 is configured to slide freely within outer rail assembly 58.

Figure 3:
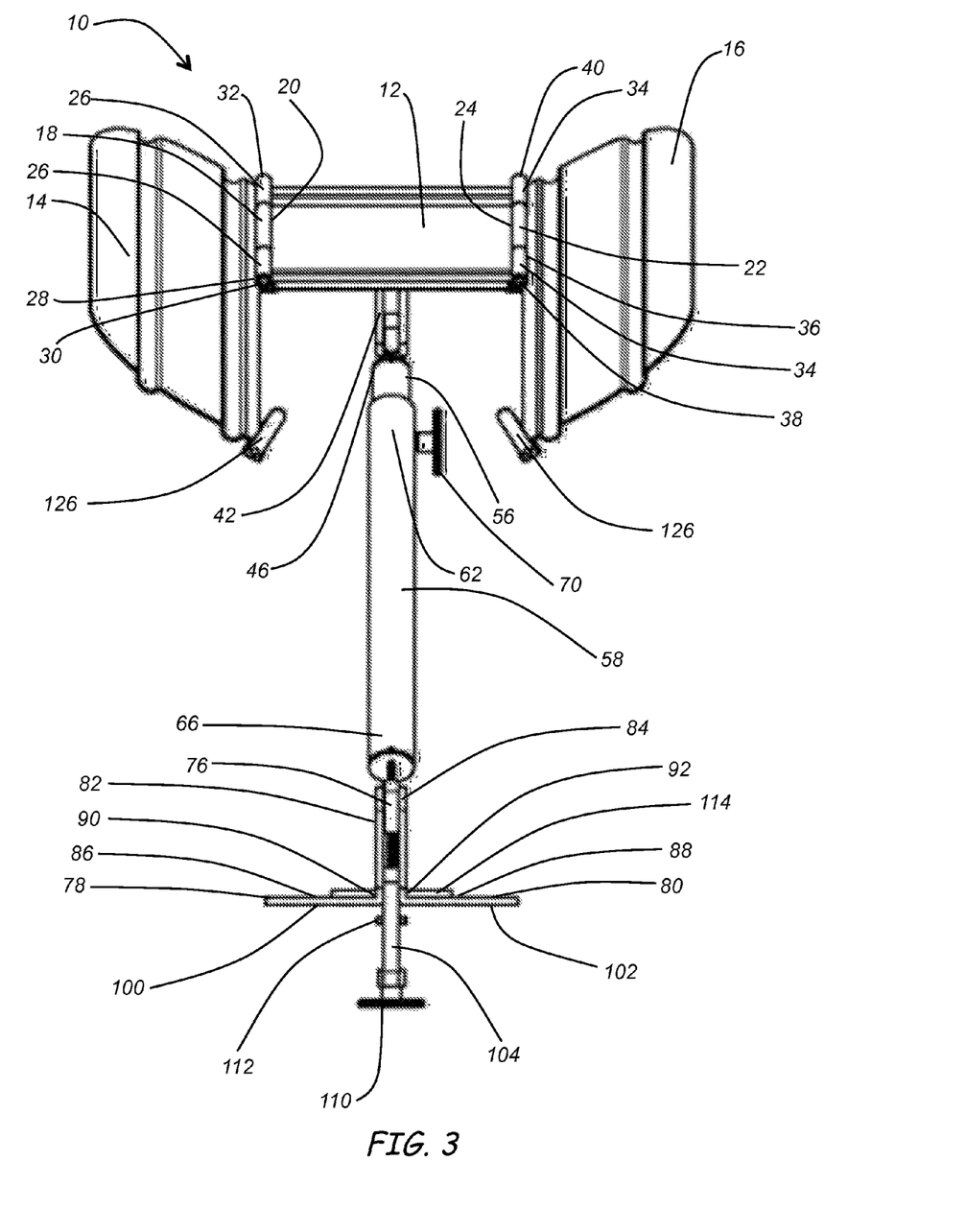
FIG. 3 is a front view of the headrest according to an embodiment of the present invention.
Figure 4:
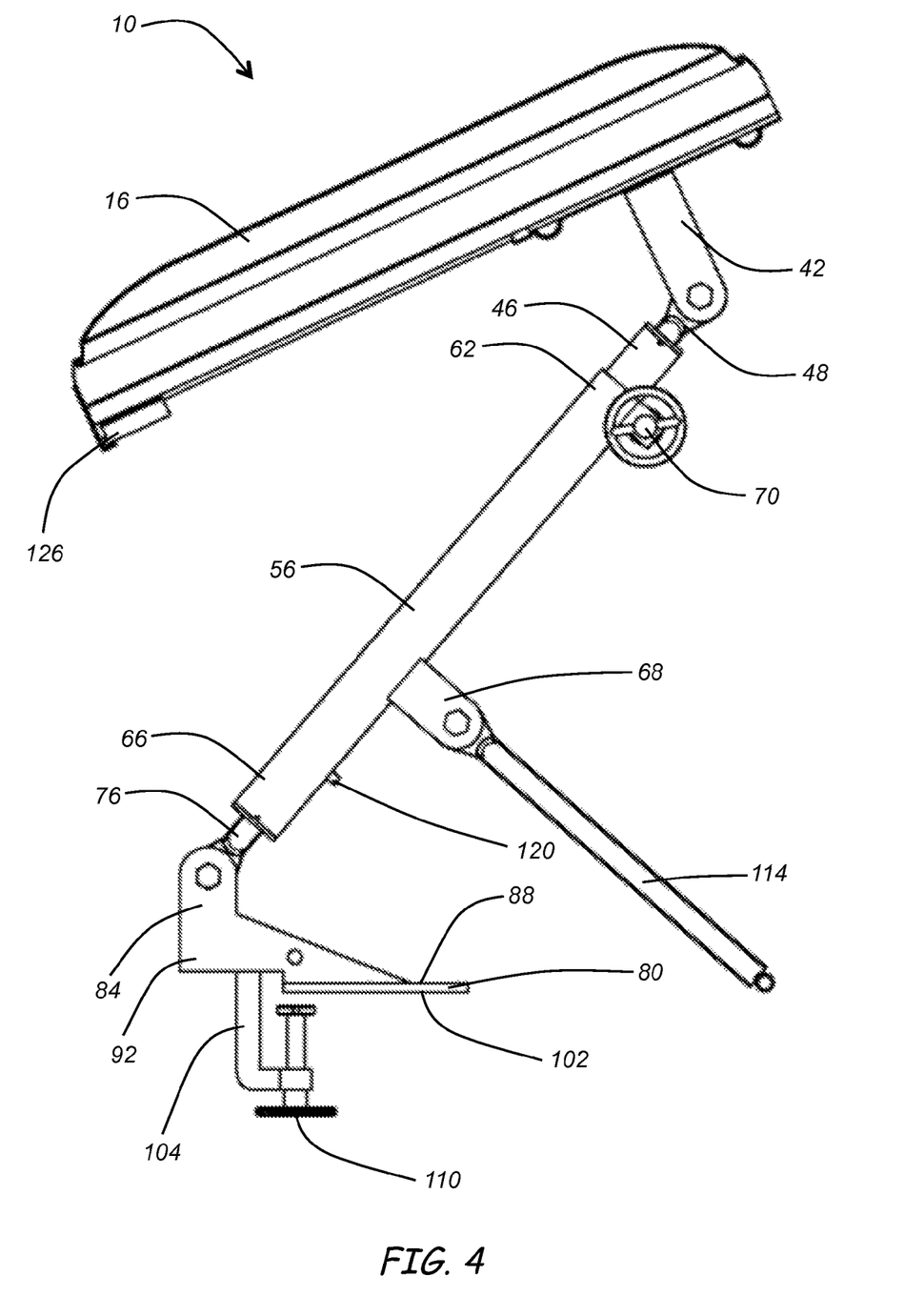
FIG. 4 is a side view of the headrest according to an embodiment of the present invention.

Headrest 10 may also include a first clamp base 78 and a second clamp base 80 that are configured to capture outer rail assembly 58. Each of first clamp base 78 and second clamp base 80 include an arm 82, 84 that extend generally upward from a top surface 86, 88 of each clamp base 78, 80. In this particular embodiment of the present invention, first clamp base 78 and second clamp base 80 are mirror images of each other. Viewing headrest 10 from the front, as is depicted in FIG. 3, arm 82 extends from a right side edge 90 of first clamp plate 78 and arm 84 extends generally upward from a left side edge 92 of second clamp base 80. Each of arms 82, 84 include a first aperture 94 that may be positioned near the top of each arm 82, 84. Each of arms 82, 84 further include a second aperture 96 that may be positioned midway down arms 82, 84. First aperture 94 of each of arms 82, 84 may be configured to accept a fastener to capture outer rail assembly 58.

Head assembly 76 of outer rail assembly 58 may be configured and sized to fit in between arms 82, 84 of first clamp base 78 and second clamp base 80. Head assembly 76 includes an aperture 98 that may be aligned with first aperture 94 such that a bolt or pin may be introduced into and through apertures 94 and 98 to secure outer rail assembly 58 to clamp bases 78 and 80. A nut or cotter pin may be added to bolt or pin to secure bolt or pin to headrest 10.

Alternatively, as described above, a hex shaped pin may be secured in aperture 94 of bases 78 and 80 and aperture 98 of head assembly 76. The hex pin may fit securely within teeth of aperture 98 such that the edges of the hex pin engage the teeth of aperture 98. Head assembly 76 may be a typical ratchet assembly with the ratchet mechanism of aperture 98 allowed to rotate with respect to head assembly 76. The ratchet assembly may allow head assembly 76 to be rotated in a first direction and locked in a second direction. Typically, a switch is added to the ratchet assembly to allow the rotation and locking directions of the ratchet assembly to be changed. With hex pin and the teeth of aperture 98 engaged and the switch in a first position, the location of head assembly 76 relative to bases 78 and 80 can be adjusted to optimize the position of outer rail assembly 58, inner rail assembly 46 and center plate 12 to suit the individual. The switch may be moved to a second position to allow the ratchet assembly to be moved in the opposite direction. Enabling head assembly 76 in this manner provides for the position of center plate 12 to be changed relative to head assembly 76, outer rail assembly 58 and inner rail assembly 46 to allow the individual position headrest 10 in the position most comfortable for the individual.

Each of first clamp base 78 and second clamp base 80 are further include bottom surfaces 100 and 102 respectively, bottom surfaces 100 and 102 may be configured to engage a surface such as a table, tray 124 (See FIG. 1) and the like. A clamp body 104 may also be included with headrest 10 and clamp body 104 may be configured in the shape of the letter "C" and be further configured to be captured between arms 82 and 84 of clamp bases 78 and 80. Clamp body 104 includes a first hole 106 that may be sized and configured to align with second aperture 96 of arms 82 and 84 of clamp bases 78 and 80 such that a bolt or pin may be introduced into and through apertures 106 and 96 to secure clamp body 104 to clamp bases 78 and 80. A nut or cotter pin may be added to bolt or pin to secure bolt or pin to headrest 10. Clamp body 104 may include a second hole 108 that may be sized, drilled and tapped to accept a clamp screw 110. A threaded end 112 of clamp screw 110 may be introduced into hole 108 and clamp screw 110 may be rotated in a first direction such that threaded end 112 of clamp screw 110 exits out an opposite end of hole 108. Clamp screw 110 may be rotated in a second direction opposite from the first direction to remove threaded end 112 from hole 108 of clamp body 104.

With first clamp plate 78, second clamp plate 80, clamp body 104 and clamp screw 110 configured in this manner, headrest may be attached to tray top table 124, such as found in many airplane seats, table, countertop and the like. Clamp plates 78 and 80 may be positioned such that bottom surfaces 100 and 102 of clamp plates 78 and 80 rest upon a top surface such as a tray table. By positioning clamp plates 78 and 80 in this manner, clamp body 104 will be situated such that clamp screw 110 is positioned proximate a bottom surface of the tray table. As described above, clamp screw 110 may be rotated in a first direction such that threaded end 112 of clamp screw 110 will engage the bottom surface of the tray table. Clamp screw 110 may be rotated in this first direction such that the distance between clamp plates 78, 80 and threaded end 112 of clamp screw 110 decreases to a point that the tray table is captured between clamp plates 78 and 80 and threaded end 112 of clamp screw 110. The tightening of threaded end 112 against the bottom surface of the tray table and clamp plates 78 and 80 will anchor headrest 10 to the tray table.

Headrest 110 may also include a brace assembly 114 that may be secured to outer rail assembly 58 at tabs 68. Tabs 68 of outer rail assembly 58 may include holes 116 that may align with an aperture 118 of brace assembly 114. Holes 116 of tabs 68 and aperture 118 of brace assembly 114 may be configured such that holes 116 and aperture 114 are aligned. A bolt or pin may be introduced into and through holes 116 and aperture 118 to secure brace assembly 114 to outer rail assembly 58. A nut or cotter pin may be added to bolt or pin to secure bolt or pin to headrest 10. Brace assembly 114 may be configured in the shape of the letter "T" with aperture 118 be situated near the bottom of brace assembly 114 and the "T" shape being positioned at the top of brace assembly 114. The top of brace assembly 114 is configured to engage the top surface of tray table 124 as illustrated in FIG. 1 to provide support for headrest 110 while in use.

Alternatively, as described above, a hex shaped pin may be secured in holes 116 of outer rail assembly 58 and aperture 118 of brace assembly 114. The hex pin may fit securely within teeth of aperture 118 such that the edges of the hex pin engage the teeth of aperture 118. Brace assembly 114 may include a typical ratchet assembly with the ratchet mechanism of aperture 118 allowed to rotate with respect to brace assembly 114. The ratchet assembly may allow brace assembly 114 to be rotated in a first direction and locked in a second direction. Typically, a switch is added to the ratchet assembly to allow the rotation and locking directions of the ratchet assembly to be changed. With hex pin and the teeth of aperture 118 engaged and the switch in a first position, the location of brace assembly 114 relative to outer rail assembly 58 can be adjusted to provide optimal support for the remainder of headrest 10 as the position of headrest 10 is changed to suit the individual. The switch may be moved to a second position to allow the ratchet assembly to be moved in the opposite direction. Enabling brace assembly 114 in this manner provides for the position of center plate 12 to be changed relative to head assembly 76, outer rail assembly 58 and inner rail assembly 46 to allow the individual position headrest 10 in the position most comfortable for the individual.

Figure 5:
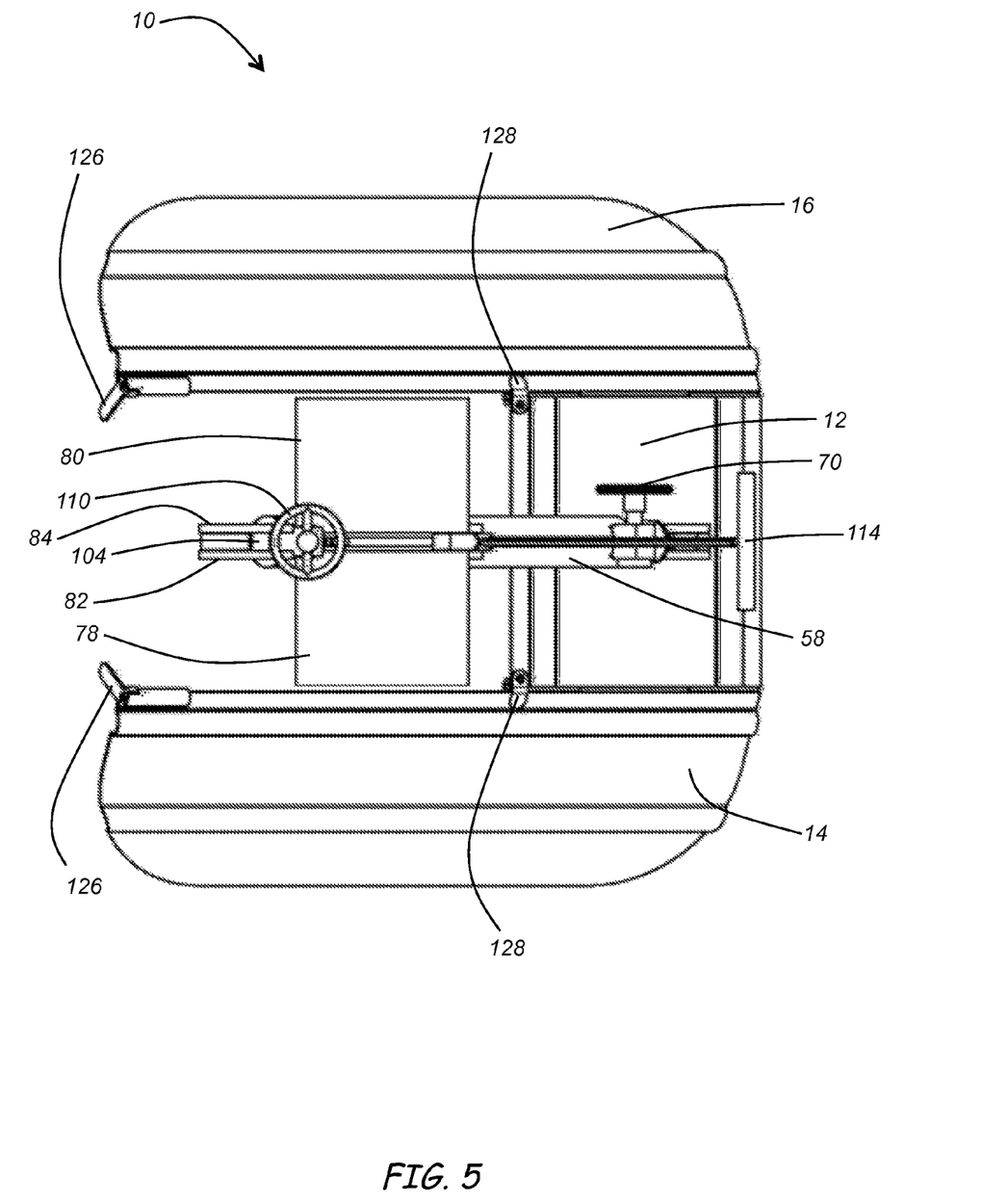
FIG. 5 is a bottom view of the headrest according to an embodiment of the present invention.
Figure 6:
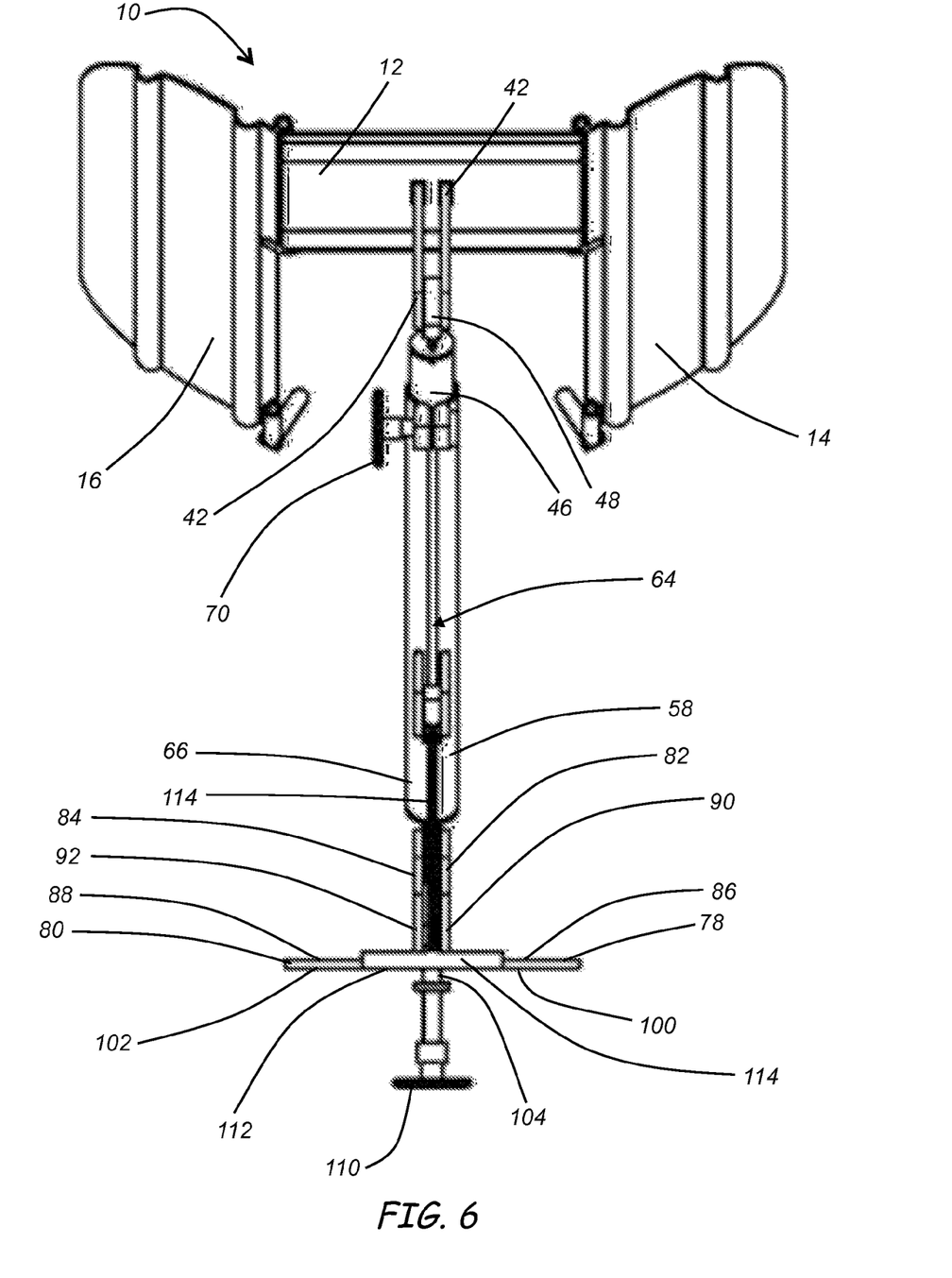
FIG. 6 is a rear view of the headrest according to an embodiment of the present invention.
Figure 7:
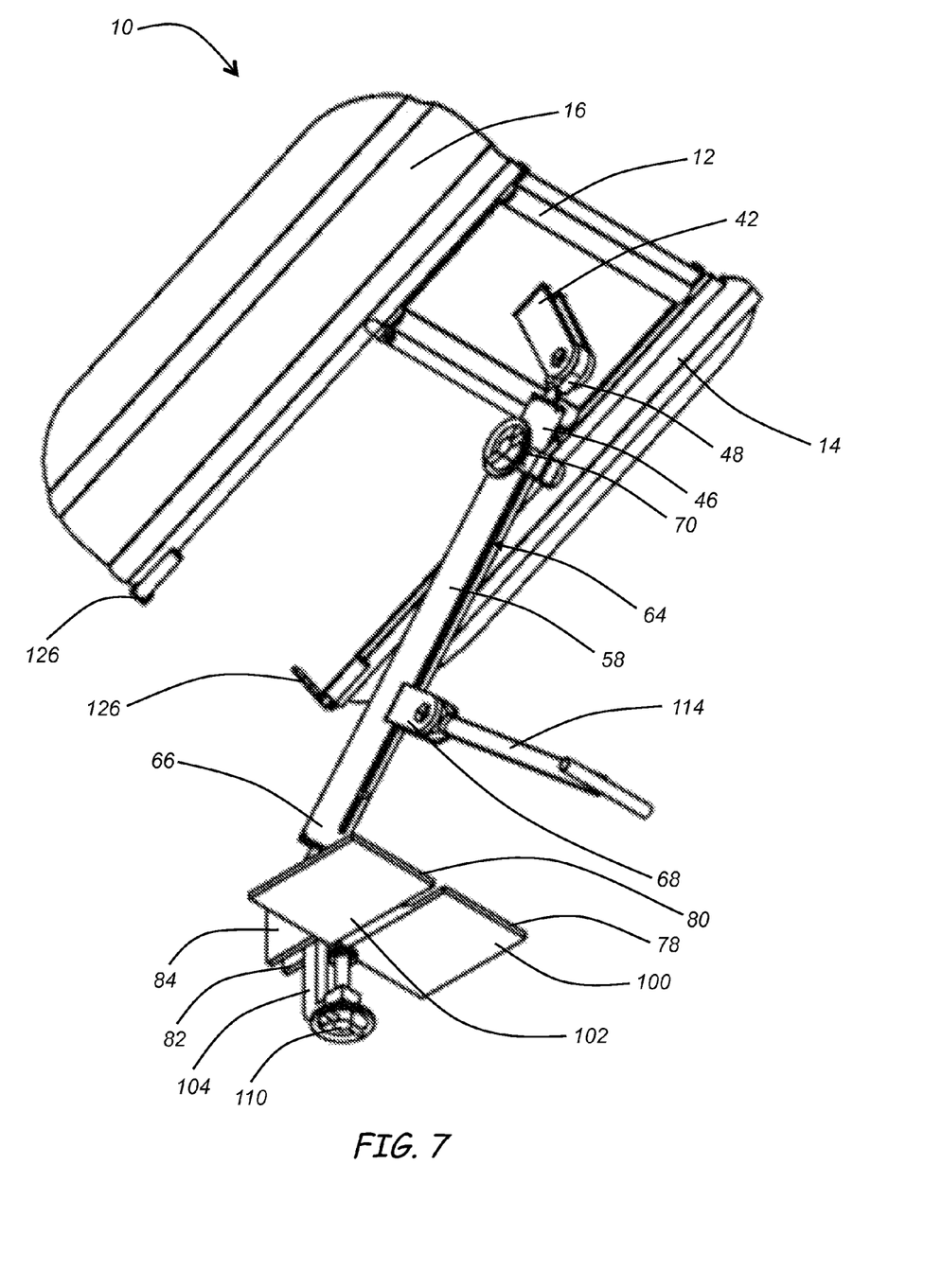
FIG. 7 is a bottom perspective view of the headrest according to an embodiment of the present invention.

As depicted in FIG. 1, headrest 10 is shown in use by the individual to comfortably support the individual's head, neck and back while resting during a long airplane flight, car or train ride, or while at home and in the office. Locking tabs 128, as shown in FIG. 5, may be added to headrest 10 and may be used to fix the position of first side plate 14 and second side plate 16 relative to center plate 12. As illustrated by FIGS. 1, 2, 3, 4 and 6, side plates 14 and 16 may be rotated inward toward center plate 12 to create a cradle to capture cushion 122 when headrest 10 is to be used for relaxation. In this particular embodiment of the present invention, locking tabs 128 may be designed such that the angle of side plates 14 and 16 relative to center plate 12 is generally 35 degrees. It is important to note, however, that side plates 14 and 16 may be fixed at any angle relative to center plate 12 and still provide support for cushion 122 to allow the individual a moment of rest and relaxation.

Although this particular embodiment of the present invention may rely on the use of locking tabs to position side plates 14 and 16 relative to center plate 12, alternative means may be used to position side plates 14 and 16 relative to center plate 12. For example, a wire may be secured to each of side plates 14 and 16. The opposite end of the wire that is not attached to side plates 14 and 16 may include a hook that is configured to engage a slot of center plate 12. The length of the wire may be such that side plates 14 and 16 may be rotated upward with respect to center plate 12 to secure the hook in the slot of center plate 12. The rotation of side plates 14 and 16 relative to center plate 12 will induce and angle between the plates and create the cradle described above to capture cushion 122. Alternatively, hinges 32 and 40 may include a locking feature that will enable side plates 14 and 16 to be positioned relative to center plate 12 to create the cradle described above to capture cushion 122 within headrest 10.

Figure 2:
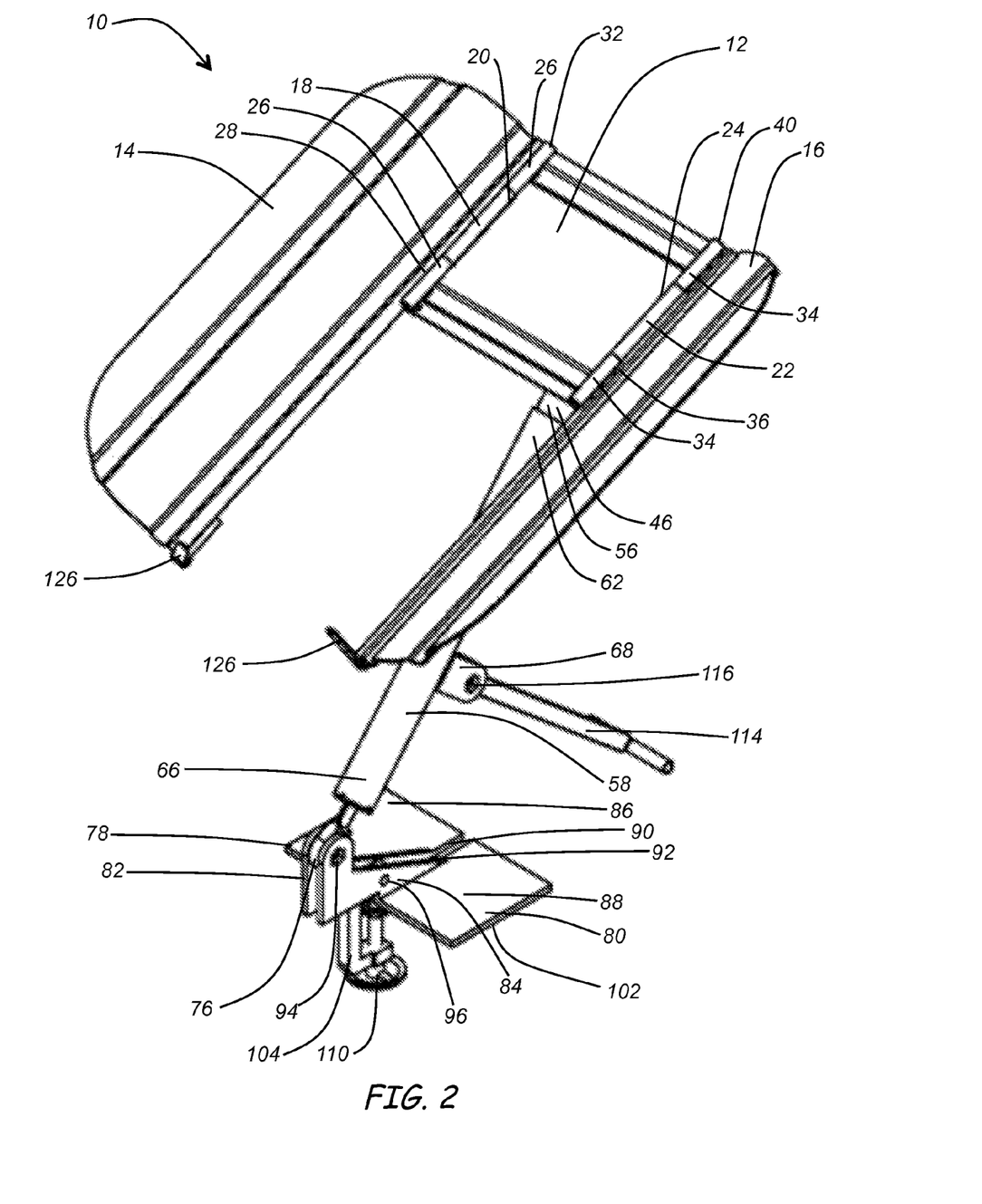
FIG. 2 is a perspective view of a headrest according to an embodiment of the present invention.

In another embodiment of the present invention, headrest 10 may be used to aid the individual in reading a book, magazine, newspaper and the like or working or enjoying a computer. Typically, when flying in an airplane or traveling by train or car or, alternatively, while at home or in the office, the trays and tables in use to support reading material or a computer are typically fixed at a single position with no means of adjusting the tray or table to comfortably read or work. Headrest 10 may be used as a platform to support reading material or a computer to improve the comfort of the individual undertaking the reading or work on a computer. Generally, it may be best if plates 12, 14 and 16 of headrest 10 were in a flat plane rather than then angled in the cradle described above. Plates 14 and 16 may be lowered to the same level as center plate 12 by rotating locking tabs 128 such that the angled piece of locking tabs 128 is rotated to provide clearance to plates 14 and 16 to lie in the same plane as center plate 12. With plates 14 and 16 in the same generally flat plane as center plate 12, a book, newspaper, magazine or computer may be set easily onto the plates of headrest 10. Stops 126 may be added to headrest 10 as illustrated in FIGS. 2 and 3 to ensure that the reading material or computer does not slide off the plates of headrest 10 while used in this manner.

While headrest 10 is shown as an independent unit that may be secured to tray 124 or table of an airplane, car or train or a tray or table of a home, restaurant, office, gym and the like, headrest 10 may also be integrated into a seat of an airplane, train, car or any piece of furniture (such as a chair or table). Integrating headrest 10 into an airplane seat will still ensure that the individual will can make adjustments to the plates and rail assemblies to locate headrest 10 to an optimal position for comfort. In another embodiment of the present invention, head assembly 76 of outer rail assembly 58 may be secured directly to a seat, chair, tray or table to integrate headrest 10 into the seat, chair, tray or table.

As described above, the components of headrest 10, first side plate 14, second side plate 16, inner rail assembly 46 and outer rail assembly 58 may be adjusted by using the ratcheting features of head assemblies 48 and 76 and brace assembly 114 to rotate plates 12, 14 and 16 into a comfortable position for the individual. The tensioning screw 70 of outer rail assembly 58 may be loosened or tightened to adjust the length of inner rail assembly 46 and outer rail assembly 58 to raise and lower the position of headrest 10 to a comfortable location for the individual. Overall headrest 10 provides for numerous adjustments to ensure that headrest 10 is in the most comfortable position possible to alleviate any stress due to head, neck, back and overall body pain.

Each of the components of headrest 10 described above, plates 12, 14 and 16, inner rail assembly 46, outer rail assembly 58 and brace assembly 114 may be adjusted as discussed to ensure that headrest 10 is positioned for the optimal comfort of the individual while at rest or while working or enjoying reading material or a computer. Headrest 10 will help to ensure that an individual can rest their head, neck and back comfortably and also help to ensure that an individual does not have to strain their neck and back while looking down to read material or a computer that is position on a tray table in an airplane, train or car. Headrest 10 will allow the individual to raise the reading material and computer to a comfortable level to relieve any stress on the eyes, neck, head or back.

Headrest 10 may be used by the individual for any type of massage therapy as well to further aid in the reduction of stress brought on by head, neck and back strain.

The present invention has been particularly shown and described with reference to the foregoing embodiment, which is merely illustrative of the best modes presently known for carrying out the invention. It should be understood by those skilled in the art that various alternatives to the embodiment of the invention described herein may be employed in practicing the invention without departing from the spirit and scope of the invention as defined in the following claims. It is intended that the following claims define the scope of the invention and that the method within the scope of these claims and their equivalents be covered thereby. This description of the invention should be understood to include all novel and non-obvious combination of elements described herein, and claims may be presented in this or a later application to any novel non-obvious combination of these elements. Moreover, the foregoing embodiment is illustrative, and no single feature or element is essential to all possible combinations that may be claimed in this or a later application.

What is claimed is:

1. A portable headrest comprising:
    a center plate;
    a first side plate;
    a second side plate, said center plate, said first side plate and said second side plate cooperatively configured to support a human head;
    a first hinge mechanism to couple said first side plate to said center plate; said first side plate configured to rotate about said first hinge mechanism relative to said center plate;
    a second hinge mechanism to couple said second side plate to said center plate; said second side plate configured to rotate about said second hinge mechanism relative to said center plate;
    an inner rail assembly; said inner rail assembly including a ratchet assembly to couple said inner rail assembly to said center plate such that said inner rail assembly extends angularly from said center plate; said ratchet assembly configured to allow said center plate to rotate relative to said inner rail assembly; and
    an outer rail assembly; said inner rail assembly sized and configured to slide freely within said outer rail assembly; said outer rail assembly including a ratchet assembly to couple said outer rail assembly to a mount such that said outer rail assembly extends angularly from the mount, said ratchet assembly configured to allow said outer rail assembly to rotate relative to the mount.

2. The headrest as claimed in claim 1 further including:
    a base assembly; said base assembly including:
        a first clamp base;
        a second clamp base; said first clamp base and said second clamp base configured to couple said ratchet assembly of said outer rail assembly to said base assembly; and
        a clamp body, said clamp body including a clamp screw; said first clamp base and said second clamp base configured to couple said clamp body there between such that said base assembly may be attached to the mount.

3. The headrest as claimed in claim 1 wherein said first hinge mechanism is comprised of a first tube disposed on a first edge of said center plate, a pair of tubes disposed on an edge of said first plate, wherein said pair of tubes are configured to align with said first tube of said center plate, and a pin configured to couple said first tube to said pair of tubes.

4. The headrest as claimed in claim 1 wherein said second hinge mechanism is comprised of a second tube disposed on a second edge of said center plate, a pair of tubes disposed on an edge of said second plate, wherein said pair of tubes are configured to align with said second tube of said center plate, and a pin configured to couple said second tube to said pair of tubes.

5. The headrest as claimed in claim 1 wherein said outer rail assembly includes a slot.

6. The headrest as claimed in claim 5 wherein said inner rail assembly includes a pin configured to be captured within said slot of said outer rail assembly to limit the rotation of said inner rail assembly relative to said outer rail assembly.

7. The headrest as claimed in claim 5 wherein said outer rail assembly includes a pair of blocks disposed at an end of said outer rail assembly and positioned about said slot, said pair of blocks including a tapped aperture sized to accept a tensioning screw, whereas said slot, said pair of blocks and said tensioning screw are cooperatively configured to decrease an inner diameter of said outer rail assembly about an outer diameter of said inner rail assembly to capture said inner rail assembly against said outer rail assembly to prevent fore and aft movement of said inner rail assembly relative to said outer rail assembly, thereby allowing the total length of said inner rail assembly and said outer rail assembly to be fixed or adjusted.

8. The headrest as claimed in claim 5 wherein said outer rail assembly includes a threaded end sized to accept an outer rail nut, whereas said slot and said outer rail nut are cooperatively configured to decrease an inner diameter of said outer rail assembly about an outer diameter of said inner rail assembly to capture said inner rail assembly against said outer rail assembly to prevent fore and aft movement of said inner rail assembly relative to said outer rail assembly, thereby allowing the total length of said inner rail assembly and said outer rail assembly to be fixed or adjusted.

9. The headrest as claimed in claim 1 further including a brace assembly, said brace assembly including ratchet assembly to couple said brace assembly to said outer rail assembly such that said brace assembly extends angularly from said outer rail assembly, said ratchet assembly configured to allow said brace assembly to rotate relative to said outer rail assembly.

10. The headrest as claimed in claim 1 further including a first locking tab and a second locking tab, said first locking tab and said second locking tab being angled and coupled to said center plate and configured to be rotated about said center plate relative to said first side plate and said second side plate such that said first side plate and said second side plate can be held at a set angle relative to said center plate when the angled portion of said first locking tab engages said first side plate and the angled portion of said second locking tab engages said second side plate.

11. A seat comprising:
    a headrest comprising:
        a center plate;
        a first side plate;
        a second side plate, said center plate, said first side plate and said second side plate configured to support a human head;
        a first hinge mechanism to couple said first side plate to said center plate; said first side plate configured to rotate about said first hinge mechanism relative to said center plate;
        a second hinge mechanism to couple said second side plate to said center plate; said second side plate configured to rotate about said second hinge mechanism relative to said center plate;

an inner rail assembly; said inner rail assembly including a ratchet assembly to couple said inner rail assembly to said center plate such that said inner rail assembly extends angularly from said center plate; said ratchet assembly configured to allow said center plate to rotate relative to said seat;

an outer rail assembly; said inner rail assembly sized and configured to slide freely within said outer rail assembly; said outer rail assembly including a ratchet assembly to couple said outer rail assembly to said seat such that said outer rail assembly extends angularly from said seat, said ratchet assembly configured to allow said outer rail assembly to rotate relative to said seat; and a brace assembly, said brace assembly including a ratchet assembly to couple said brace assembly to said outer rail assembly such that said brace assembly extends angularly from said outer rail assembly, said ratchet assembly configured to allow said brace assembly to rotate relative to said outer rail assembly.

12. The headrest as claimed in claim 11 wherein said first hinge mechanism is comprised of a first tube disposed on a first edge of said center plate, a pair of tubes disposed on an edge of said first plate, wherein said pair of tubes are configured to align with said first tube of said center plate, and a pin configured to couple said first tube to said pair of tubes.

13. The headrest as claimed in claim 11 wherein said second hinge mechanism is comprised of a second tube disposed on a second edge of said center plate, a pair of tubes disposed on an edge of said second plate, wherein said pair of tubes are configured to align with said second tube of said center plate, and a pin configured to couple said second tube to said pair of tubes.

14. The headrest as claimed in claim 11 wherein said outer rail assembly includes a slot.

15. The headrest as claimed in claim 14 wherein said inner rail assembly includes a pin configured to be captured within said slot of said outer rail assembly to limit the rotation of said inner rail assembly relative to said outer rail assembly.

16. The headrest as claimed in claim 14 wherein said outer rail assembly includes a pair of blocks disposed at an end of said outer rail assembly and positioned about said slot, said pair of blocks including a tapped aperture sized to accept a tensioning screw, whereas said slot, said pair of blocks and said tensioning screw are cooperatively configured to decrease an inner diameter of said outer rail assembly about an outer diameter of said inner rail assembly to capture said inner rail assembly against said outer rail assembly to prevent fore and aft movement of said inner rail assembly relative to said outer rail assembly, thereby allowing the total length of said inner rail assembly and said outer rail assembly to be fixed or adjusted.

17. The headrest as claimed in claim 14 wherein said outer rail assembly includes a threaded end sized to accept an outer rail nut, whereas said slot and said outer rail nut are cooperatively configured to decrease an inner diameter of said outer rail assembly about an outer diameter of said inner rail assembly to capture said inner rail assembly against said outer rail assembly to prevent fore and aft movement of said inner rail assembly relative to said outer rail assembly, thereby allowing the total length of said inner rail assembly and said outer rail assembly to be fixed or adjusted.

18. The headrest as claimed in claim 11 further including a first locking tab and a second locking tab, said first locking tab and said second locking tab being angled and coupled to said center plate and configured to be rotated about said center plate relative to said first side plate and said second side plate such that said first side plate and said second side plate can be held at a set angle relative to said center plate when the angled portion of said first locking tab engages said first side plate and the angled portion of said second locking tab engages said second side plate.

* * * * *